United States Patent [19]

Brindisi, Jr. et al.

[11] 3,919,100

[45] Nov. 11, 1975

[54] ALKALINE ETCHANT COMPOSITIONS

[75] Inventors: Frank A. Brindisi, Jr., Madison, Conn.; Jo Wynschenk, Glen Ellyn, Ill.; Theophil J. Wieczorek, West Haven, Conn.

[73] Assignee: Enthone, Incorporated, West Haven, Conn.

[22] Filed: Apr. 24, 1974

[21] Appl. No.: 463,709

[52] U.S. Cl. .......... 252/79.1; 156/18

[51] Int. Cl.[2] .......... C09K 13/00

[58] Field of Search .......... 156/14, 18; 252/79.4, 79.5, 252/79.2, 79.1

[56] References Cited

UNITED STATES PATENTS

| | | | |
|---|---|---|---|
| 3,325,410 | 6/1967 | Crotty | 252/79.4 |
| 3,367,874 | 2/1968 | Haviland et al. | 252/79.4 |
| 3,442,810 | 5/1969 | Elbreder | 252/79.4 |
| 3,705,061 | 12/1972 | King | 156/19 |
| 3,837,945 | 9/1974 | Chiang | 156/18 |
| 3,855,141 | 12/1974 | Ruff | 252/79.4 |

*Primary Examiner*—Charles E. Van Horn
*Assistant Examiner*—Jerome W. Massie
*Attorney, Agent, or Firm*—R. J. Drew; E. J. Schaffer

[57] ABSTRACT

Alkaline etchant solutions for dissolving copper at a controlled relative slow rate, the solution comprising cupric ions as oxidant for metallic copper, sulfamate ions for accelerating appreciably the etching of the copper, and ammonium ions for maintaining the pH of the etchant on the alkaline side of pH and also for complexing dissolved ionic copper. The etchant solutions are especially well adapted for selective etching away of unwanted copper in the manufacture of additive circuit boards.

11 Claims, No Drawings

ALKALINE ETCHANT COMPOSITIONS

BACKGROUND OF THE INVENTION

1. Field of the Invention

This invention relates to etching copper and more especially to new and improved alkaline etchant solutions and processes for dissolving copper.

2. Description of the Prior Art

U.S. Pat. No. 3,505,135 discloses the steady state etching of copper cladded printed circuit boards utilizing an ammonium persulfate solution having an initial predetermined molar concentration as etchant. Copper is removed from solution at the rate in which it is dissolved therein and etching reagent consumed during the etching process is replaced at an equivalent rate. U.S. Pat. No. 3,705,061 relates ot a continuous redox process for dissolving copper. An alkaline etch solution containing cupric ions as oxidizer is used to oxidize and thereby dissolve copper with attendant reduction of the cupric ions to the cuprous state. A portion of the etch solution is continuously removed from the system, and a source of oxygen and an ammonia based replenishing solution are added to the etch solution to reconstitute it. The replenishing solution requirements of the system are determined by continuously monitoring the specific gravity of the etch solution and the pH with respect to ammonium content. U.S. Pat. No 3,466,208 discloses alkaline ammoniacal chlorite solutions for dissolving copper and containing one or both of ammonium chloride and ammonium nitrate in full or partial substitution of ammonium bicarbonate used in a prior system. U.S. Pat. No. 3,677,950 discloses a chemical etchant solution for dissolving copper from printed circuit boards and consisting of an aqueous ammoniacal solution of a normally acidic oxidizer such as ammonium persulfate, cupric chloride or cupric sulfate, the solution having an alkaline pH up to about 11. U.S. Pat. No. 3,650,957 relates to etching solutions for stripping copper from substrates and containing a source of cupric ions as an oxidant, one or more complexing agents for the cupric ions which is capable of forming a soluble copper (II) complex at solution pH, a source of bromide or chloride ions, and molybdenum, tungsten or vanadium ions for retarding attack on tin and tin-lead solder plate, the solutions having a pH between about 4 and 13. U.S. Pat. No. 3,650,958 discloses etchant solutions for copper containing a source of cupric ions, and one or more non-fuming complexing agents for the cupric ions, the complexing agent being capable of forming a soluble copper (II) complex at solution pH. U.S. Pat. No. 3,650,959 discloses etchant solutions for copper, containing a source of cupric ions, one or more non-fuming complexing agents for cupric ions which is capable of forming a soluble copper (II) complex at solution pH, chloride or bromide ions, and nitrate ions in amount sufficient to prevent build-up of a film on the surface of the copper being etched. U.S. Pat. No. 3,367,874 pertains to acid baths for dissolving nickel, copper, zinc, cobalt or iron and containing concentrated nitric acid, and a mixture of additives capable of providing urea in the bath and capable of forming sulfamate ions in the bath. U.S. Pat. No. 3,537,895 discloses cleaning-pickling solutions for removing copper oxides from copper, the solutions being aqueous solutions containing sulfuric acid, sulfamic acid, or an equivalent acid salt thereof for dissolving cupric oxide from the surface of a workpiece, hydrogen peroxide, and an organic stabilizing compound such as an organic compound from the class of benzoic, glycolic or propionic acids, glycerine, ethylene and propylene glycols.

The prior art etchant solutions are in general not suitable for etching away copper in the manufacture of additive-type printed circuit boards. The reasons for this is the prior art etchant solutions etch copper at too fast a rate and the etching rate fluctuates excessively. In additive-type printed circuit board manufacture a thin copper film is electrolessly deposited over the entire dielectric board from an electroless copper plating solution, as contrasted with the relatively thick copper foil bonded to the board in subtractive-type printed circuit board manufacture. In selectively etching away unwanted copper in additive-type printed circuit board manufacture, it is important to etch away the unwanted copper at a relatively slow rate to avoid etching away the entire circuit, which occurs with use of the prior art etchant solutions having the fast or high speed etching rate. Furthermore, use of the prior art etchant solutions having the fast etching rate for etching copper in additive-type circuit board manufacture results in undesirable undercutting of the circuit lines.

OBJECTS OF THE INVENTION

One object of the invention is to provide new and improved etchant solutions for dissolving copper.

Another object is to provide new etchant solutions especially adapted for use in selectively etching away copper in additive-type printed circuit board manufacture.

A further object is to provide new etchant solutions characterized by etching copper at a desired controlled slow rate.

A further object is to provide new etchant solutions capable of etching away unwanted copper in the preparation of additive-type printed circuit boards without any substantial undercutting of the circuit lines or pattern.

Still another object is to provide a new and improved process for dissolving or etching away copper.

Additional objects and advantages will be readily apparent as the invention is hereinafter described in more detail.

SUMMARY OF THE INVENTION

The aforementioned objects and advantages are attained in accordance with the present invention by an alkaline etchant solution comprising essentially sulfamate ions for accelerating appreciably the etching or dissolving of the copper, cupric ions as an oxidant for the copper, and ammonium ions for maintaining the solution pH on the alkaline side of pH 7.

The etchant solution of this invention is characterized by the highly desirable property that its stripping rate for stripping or etching copper can be either increased or decreased (although still faster than in the absence of the sulfamate ions) at any given copper content of the solution merely by varying the sulfamate ion concentration of the solution. Thus at any given copper concentration of the solution, the rate of stripping or dissolving copper can be increased merely by increasing the concentration of sulfamate ions in the solution, or the stripping rate for copper can be lowered simply by having a lower concentration of sulfamate ions in the solution albeit still an appreciably faster stripping rate than in the absence of the sulfamate ions.

The cupric ions are supplied in the etchant solutions of this invention by cupric carbonate or cupric ammonium sulfate ($Cu(NH_4)_2(SO_4)_2$). Only these two cupric salts of the plurality of copper salts tested resulted in the desired slow rate of etching the copper by the etchant solution.

Cupric chloride, cupric nitrate or cupric acetate were found to be unsatisfactory in the etchant solutions due to resulting in the etchant solution etching away the copper at an undesirable fast rate, which was attributed to the anion of these cupric salts. Cupric sulfate was also found to be unsatisfactory in the etchant solution due to forming a sludge in the etching machine after only a limited time, and resulting in clogging of the spray nozzles of the machine.

The sulfamate ions are supplied in the etchant solutions of this invention by any suitable source of sulfamate ion. Exemplary of the sulfamate ion source is sulfamic acid, ammonium sulfamate, and an alkali metal sulfamate, e.g. sodium or potassium sulfamate.

Any suitable source of ammonium ion is utilizable in The etchant solutions herein. As exemplary, ammonium hydroxide, ammonium sulfamate, ammonium chloride, ammonium nitrate, ammonium phosphate, ammonium carbonate, ammonium citrate, and $NH_3$ gas which forms in situ in the etchant solution $NH_4^+$ ions are utilizable.

The sulfamate ions (calculated as $OSO_2NH_2$) are present in the etchant solutions of this invention in an effective amount, which is sufficient to accelerate appreciably the etching or dissolving of the copper. The sulfamate ions may be present in the etchant solutions herein in an effective amount of at least 0.2 mole per liter. The amount of sulfamate ions utilized in the etchant solutions herein should be insufficient to result in an uncontrollable, fast etching rate, and a fast etching rate which results in significant undercutting of the circuit lines or pattern in the preparation of additive-type printed circuit boards.

The cupric ions may be present in the etchant solutions herein in an amount (calculated as Cu) of 0.2 mole per liter to saturation.

The ready-to-use etchant solutions of this invention will usually contain the constituents in amounts within the following proportion ranges:

- Sulfamate ions (calculated as $OSO_2NH_2$)— from about 0.3 to 1.0 mole per liter
- Cupric ions (calculated as Cu)— from about 0.3 to 1.0 mole per liter
- Ammonium ions (calculated as $NH_4$)— sufficient to maintain pH in the range of about 8 to about 12.

The etchant solutions herein are usually supplied as a concentrate which is adapted to be mixed together with an aqueous liquid, such as water, to form the ready-to-use etchant solution. A source of ammonium ion may also be mixed together with the concentrate solution and water. The concentrate solutions are usually aqueous solutions containing cupric ions, sulfamate ions and ammonium ions. The etchant concentrate solutions of course contain a lesser amount of water than do the ready-to-use etchant solutions. The concentrate solution is mixed together with water by the user to form the ready-to-use etchant solution typically in a volume ratio of concentrate solution to water of about 1:3 respectively.

The etchant concentrate solutions will usually contain the constituents in amounts within the following proportion ranges:

- Sulfamate ions (calculated as $OSO_2NH_2$)— from about 0.3 to 3.0 moles per liter
- Cupric ions (calculated as Cu)— from about 0.3 to 3.0 moles per liter
- Ammonium ions (calculated as $NH_4$)— from about 1 to 18 moles per liter The temperature of the etchant solutions herein during the dissolution or etching of the copper can be room temperature or elevated temperatures up to about 135°F. The etching rate increases with increasing solution temperature. Temperatures of the etchant solution much above 135°F. should be avoided, due to expelling ammonia at such higher temperatures.

The ionic copper concentration of the etchant solution during the etching process can be determined by any suitable means or method. Thus the determination of the ionic copper concentration, such as the cupric ion concentration can be effected by batch or manual means or method or by continuous or automatic means or method. One suitable means and method for the continuous determination of the ionic copper concentration of the etchant solution is that disclosed and claimed in U.S. Pat. No. 3,705,061 and involving sensing the specific gravity of the solution, to generate a signal when the concentration of ionic copper reaches a predetermined maximum. Exemplary of a batch or manual means and method for determining the ionic copper concentration is titration.

When required, the sulfamate ions are replenished in the etchant solutions herein. The replenishment of the sulfamate ions in the solution is conveniently effected by adding a replenisher solution containing the sulfamate ions, ammonium ions and water to the etchant solution. The replenisher solution is exemplified by an aqueous solution of the following composition:

| | |
|---|---|
| Sulfamic acid | 290 g/l |
| Ammonium hydroxide | 500 g/l |
| $H_2O$ | to 1 liter |

The designation "g/l" herein means grams per liter. The addition of this replenisher concentrate also serves to maintain the pH of the solution within the desired alkaline pH range due to the ammonium ions.

The following examples of ready-to-use etchant solutions of this invention for dissolving copper are illustrative only:

Example I

| | |
|---|---|
| Sulfamic acid (calculated as sulfamate, i.e. $OSO_2NH_2$) | 0.3 mole/liter |
| Cupric carbonate (calculated as Cu) | 0.3 mole/liter |
| Ammonium hydroxide | sufficient to maintain pH in the range of about 11-12 |
| $H_2O$ | to 1 liter |

Example II

| | |
|---|---|
| Sulfamic acid (calculated as sulfamate, i.e. $OSO_2NH_2$) | 0.5 mole/liter |
| Cupric carbonate (calculated as Cu) | 0.6 mole/liter |
| Ammonium hydroxide | sufficient to maintain pH in the range of about 11-12 |
| $H_2O$ | to 1 liter |

Example III

| | |
|---|---|
| Sulfamic acid (calculated as sulfamate, i.e. $OSO_2NH_2$) | 1.0 mole/liter |
| Cupric carbonate (calculated as Cu) | 1.0 mole/liter |
| Ammonium hydroxide | sufficient to maintain pH in the range of about 11–12 |
| $H_2O$ | to 1 liter |

Example IV

| | |
|---|---|
| Sulfamic acid (calculated as sulfamate, i.e. $OSO_2NH_2$) | 0.5 mole/liter |
| Cupric carbonate (calculated as Cu) | 0.3 mole/liter |
| Ammonium hydroxide | sufficient to maintain pH in the range of about 11–12 |
| $H_2O$ | to 1 liter |

The following examples of etchant concentrate solutions of this invention, which are adapted to be mixed together with water to form the ready-to-use concentrate solutions, are illustrative only.

Example V

| | |
|---|---|
| Sulfamic acid (calculated as sulfamate, i.e. $OSO_2NH_2$) | 0.6 mole/liter |
| Cupric carbonate (calculated as Cu) | 0.6 mole/liter |
| Ammonium hydroxide | 300 g/l |
| $H_2O$ | to 1 liter |

This aqueous concentrate solution is mixed together with water in the volume ratio of 1:1 respectively to form the ready-to-use etchant solution. Ammonium hydroxide is also added to adjust the pH of the resulting solution to within the pH range of about 11 to 12.

Example VI

| | |
|---|---|
| Sulfamic acid (calculated as sulfamate, i.e. $OSO_2NH_2$) | 0.6 mole/liter |
| Cupric carbonate (calculated as Cu) | 0.8 mole/liter |
| Ammonium hydroxide | 300 g/l |
| $H_2O$ | to 1 liter |

This aqueous concentrate solution is mixed together with water in the volume ratio of 1:1 respectively to form the ready-to-use etchant solution. Ammonium hydroxide is also added to adjust the pH of the resulting solution to within the pH range of about 11 to 12.

Example VII

| | |
|---|---|
| Sulfamic acid (calculated as sulfamate, i.e. $OSO_2NH_2$) | 0.9 mole/liter |
| Cupric carbonate (calculated as Cu) | 0.9 mole/liter |
| Ammonium hydroxide | 500 g/l |
| $H_2O$ | to 1 liter |

This concentrate solution is mixed together with water in the volume ratio of 1:3 respectively to form the ready-to-use etchant solution. Ammonium hydroxide is also added to the solution mixture to adjust the pH of the resulting solution to within the pH range of about 11 to 12.

Example VIII

| | |
|---|---|
| Sulfamic acid (calculated as sulfamate, i.e. $OSO_2NH_2$) | 3.0 moles/liter |
| Cupric carbonate (calculated as Cu) | 0.6 mole/liter |
| Ammonium hydroxide | 500 g/l |
| $H_2O$ | to make 1 liter |

This aqueous concentrate solution is mixed together with water in the volume ratio of 1:3 respectively to form the ready-to-use etchant solution. Ammonium hydroxide is also added to adjust the pH of the resulting solution to within the pH range of about 11 to 12.

The following tests were carried out:

The sulfamate ion concentration was varied by varying the sulfamic acid concentration in a plurality of solutions each initially containing 3 oz./gal. cupric ions (calculated as Cu) and $NH_4OH$ sufficient to adjust the pH to 11. The etchant solutions were each at a temperature of 75°C., and the solutions were used to etch copper from ABS panels. The copper was immersed in the solutions in separate beakers. The following results were obtained:

Table I

| Sulfamic Acid Concentration | Etching Rate Minutes to Etch 25 Micro-inches of Cu |
|---|---|
| 0.1 M | No etching (blackened Cu) |
| 0.3 M | 5.0 |
| 0.5 M | 3.5 |
| 1.0 M | 2.5 |
| 2.0 M | 2.0 |

The test results of Table I show that at a sulfamic acid concentration of 0.3 moles, the fastest etching rate occurred, and that at progressively higher sulfamic concentrations up to 2.0 moles, that etching of the copper occurred but at a progressively slower rate.

The temperature of a plurality of solutions was varied to determine the effects on the rate of etching copper. A plurality of separate solutions were made up initially containing 3oz./gal. Cu metal as $CuCO_3$—$Cu(OH)_3$, 0.3 M sulfamic acid and 150 g/l $NH_4OH$. Each solution had a pH of 11. The copper was immersed in the solutions in separate beakers in carrying out the tests. The following results were obtained.

Table II

| Temperature of Solution | Etching Rate Minutes to Etch 25 Micro-inches of Cu |
|---|---|
| 70° F. | 5.0 |
| 80° F. | 4.25 |
| 90° F. | 3.75 |
| 100° F. | 3.75 |
| 120° F. | 3.75 |
| 140° F. | Loss of $NH_4OH$ |

The test results of Table II show that the best etching rate occurred at room temperature or 70° F., and that satisfactory etching rates were attained at elevated temperatures above 70° F. The test results of Table II also show that a temperature of 140° F. resulted in loss of $NH_4OH$ from the etchant bath, which was undesirable.

A plurality of etchant solutions containing different concentrations of cupric ions and sulfamic acid as set forth in the table of test results which follows and also $NH_4OH$ in amount sufficient to adjust the pH of each solution to about 11.0, were utilized to etch copper from glass-epoxy printed circuit boards in a conventional etching machine. The etchant solutions were each at a temperature of 75° F. during the spray application to the copper in the etching machine. The following results were obtained, with the results being given hereafter in terms of the micro-inches of copper etched per minute:

| Sulfamic Acid Contents of Etchant Solution | Cu Metal Content of Etchant Solution (oz. Cu/gal of Etchant Solution) | | | | | |
|---|---|---|---|---|---|---|
| | 3 | 4 | 5 | 6 | 7 | 9 |
| 0.3 M | 100 | 110 | 115 | 120 | 115 | 100 |
| 0.5 M | 145 | 160 | 170 | 165 | 160 | 125 |
| 0.7 M | 170 | 190 | 230 | 220 | 205 | 140 |
| 1.0 M | 200 | 450 | 600 | 650 | 600 | 160 |

DESCRIPTION OF THE PREFERRED EMBODIMENTS

Cupric carbonate is the preferred source of cupric ions.

Sulfamic acid and ammonium sulfamate are the preferred source of sulfamate ion.

Ammonium hydroxide is the preferred source of ammonium ions.

The pH of the etchant solutions is preferably in the pH range of about 11 to about 12.

Preferably the ready-to-use etchant solutions herein contain the following constituents in amounts within the proportion ranges hereafter set forth:

Sulfamate ions (calculated as $OSO_2NH_2$)—from about 0.3 to 1.0 mole per liter

Cupric ions (calculated as Cu)— from about 0.3 to 1.0 mole per liter

Ammonium ions (calculated as ($NH_4$)— sufficient to maintain pH in the range of about 11 to about 12

Especially preferred ready-to-use copper etchant solutions of this invention contain the following constituents in amounts within the proportion ranges hereafter set forth:

| | |
|---|---|
| Sulfamic acid | 0.3 molar to 1.0 molar |
| Cupric ions (calculated as Cu) | 22.5 to 67.5 g/l |
| Ammonium hydroxide | 150 to 180 g/l |

Such solution has a pH in the range of about 11 to about 12.

The etchant solution is preferably at a temperature in the range of about 70° F. to about 135° F. during the etching.

Although the etchant solutions of this invention are eminently adapted for selectively etching copper in the production of additive-type printed circuit boards, these etchant solutions are also utilizable in the preparation of subtractive-type printed circuit boards or for other copper etching or dissolving purposes.

What is claimed is:

1. A ready-to-use aqueous alkaline copper etchant solution comprising cupric ions supplied by a cupric ion source selected from the group consisting of cupric carbonate and cupric ammonium sulfate as an oxidant for copper, sulfamate ions for accelerating the etching of the copper, and ammonium ions for maintaining the pH of the etchant solution on the alkaline side of pH 7, the sulfamate ions being present in an amount (calculated as $OSO_2$ $NH_2$) of at least 0.2 mole per liter but insufficient to result in an uncontrollable fast etching rate which results in significant undercutting of circuit lines in the preparation of additive-type printed circuit boards.

2. The etchant solution of claim 1 wherein the pH is maintained in the range of about 8 to about 12.

3. The etchant solution of claim 2 wherein the pH is maintained in the range of about 11 to about 12.

4. The etchant solution of claim 1 wherein the source of sulfamate ions in the solution is at least one sulfamate ion source selected from the group consisting of sulfamic acid and ammonium sulfamate.

5. The etchant solution of claim 2 wherein the source of sulfamate ions in the solution is sulfamic acid.

6. The etchant solution of claim 2 wherein the sulfamate ions (calculated as $OSO_2NH_2$) are present in an effective amount in the range from about 0.3 to 1.0 mole per liter.

7. The etchant solution of claim 1 wherein the constituents are present in amounts within the proportion ranges hereafter set forth:

Sulfamate ions (calculated as $OSO_2NH_2$)— from about 0.3 to 1.0 mole per liter Cupric ions (calculated as Cu)— from about 0.3 to 1.0 mole per liter Ammonium ions (calculated as $NH_4$)— sufficient to maintain pH in the range of about 8 to about 12.

8. An aqueous alkaline copper etchant concentrate solution adapted for mixing together with an aqueous liquid to form the ready-to-use etchant solution, the concentrate solution comprising cupric ions supplied by a cupric ion source selected from the group consisting of cupric carbonate and cupric ammonium sulfate as an oxidant for copper, sulfamate ions for accelerating the etching of the copper, and ammonium ions for maintaining the pH of the concentrate solution on the alkaline side of pH 7, the sulfamate ions being present in the ready-to-use etchant solution in an amount (calculated as $OSO_2NH_2$) of at least 0.2 mole per liter but insufficient to result in an uncontrollable fast etching rate which results in significant undercutting of circuit lines in the preparation of additive-type printed circuit boards, said concentrate solution containing a lesser amount of water than does the ready-to-use etchant solution.

9. The concentrate solution of claim 8 wherein the pH is maintained in the range of about 8 to about 12.

10. The concentrate solution of claim 8 wherein the source of sulfamate ions in the solution is at least one sulfamate ion source selected from the group consisting of sulfamic acid and ammonium sulfamate.

11. The concentrate solution of claim 9 wherein the constituents are present in proportions within the proportion ranges hereafter set forth:

Sulfamate ions (calculated as $OSO_2NH_2$)— from about 0.3 to 3.0 moles per liter Cupric ions (calculated as Cu)— from about 0.3 to 3.0 moles per liter Ammonium ions (calculated as $NH_4$)— from about 1 to 18 moles per liter

* * * * *